(12) United States Patent
Omori

(10) Patent No.: US 8,417,040 B2
(45) Date of Patent: Apr. 9, 2013

(54) IMAGE CODING APPARATUS AND IMAGE CODING METHOD

(75) Inventor: Yuji Omori, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1499 days.

(21) Appl. No.: 11/848,351

(22) Filed: Aug. 31, 2007

(65) Prior Publication Data

US 2008/0123745 A1 May 29, 2008

(30) Foreign Application Priority Data

Sep. 1, 2006 (JP) .................................. 2006-238170

(51) Int. Cl.
*G06K 9/36* (2006.01)

(52) U.S. Cl.
USPC ............................................ 382/232; 240/16

(58) Field of Classification Search .................. 382/162, 382/165, 232, 238; 358/359, 426.02, 426.04, 358/426.06, 448; 380/37; 386/300, 302, 386/353, 355, 356; 345/589, 591, 593, 597; D14/485

See application file for complete search history.

(56) References Cited

U.S. PATENT DOCUMENTS

| | | | | |
|---|---|---|---|---|
| 6,148,027 A | * | 11/2000 | Song et al. ..................... | 375/240 |
| 6,188,796 B1 | * | 2/2001 | Kadono ......................... | 382/243 |
| 6,438,254 B1 | * | 8/2002 | Kadono et al. ................ | 382/107 |
| 6,567,427 B1 | * | 5/2003 | Suzuki et al. ................. | 370/535 |
| 6,741,652 B1 | | 5/2004 | Kondo et al. ............ | 375/240.24 |
| 6,909,749 B2 | * | 6/2005 | Yang et al. ............... | 375/240.16 |
| 7,302,104 B2 | * | 11/2007 | Suino ............................ | 382/240 |
| 2010/0026886 A1 | * | 2/2010 | Sharlet et al. ................. | 348/441 |

FOREIGN PATENT DOCUMENTS

| | | |
|---|---|---|
| JP | 63-209383 A | 8/1988 |
| JP | 64-27380 A | 1/1989 |
| JP | 3028685 | 2/1991 |
| JP | 5-233815 A | 9/1993 |
| JP | 9-182080 A | 7/1997 |

OTHER PUBLICATIONS

Jeng-Hung Luo, et al., "A Novel All-Binary Motion Estimation (ABME) With Optimized Hardware Architectures", IEEE Transactions on Circuits and Systems for Video Technology, vol. 12, No. 8, Aug. 2002.

* cited by examiner

*Primary Examiner* — Kambiz Zand
*Assistant Examiner* — Leynna Truvan
(74) *Attorney, Agent, or Firm* — Fitzpatrick, Cella, Harper & Scinto

(57) ABSTRACT

In a coding apparatus for performing motion-compensated coding, N (M>N≧2)-arized images are converted from a coding target image and reference image as M-arized images, and a motion search is conducted using the N-arized images. During this process, the coding apparatus applies low-pass filter processing to the coding target image and the reference image before conversion of the N-arized images.

6 Claims, 6 Drawing Sheets

IMAGE CODING APPARATUS AND IMAGE CODING METHOD

BACKGROUND OF THE INVENTION

1. Field of the Invention

The present invention relates to an image coding technique and, more particularly, to an image coding technique using motion compensation.

2. Description of the Related Art

In image coding schemes specified by standards such as H.26x, MPEG, and the like, one moving image frame is divided into a plurality of blocks, and coding is done for each block.

In these image coding schemes, a coding scheme (inter coding) that exploits temporal correlation of moving image frames, and a coding scheme (intra coding) that exploits spatial correlation in one frame can be used. The coding scheme that exploits temporal correlation searches for the position in a reference frame to which a coding target block moves, and encodes the difference between a motion vector that represents the amount of motion and direction, and the block at the motion destination, thus compressing the data amount. Such coding scheme that considers the motion of a coding target block is called a motion-compensated coding scheme.

In order to improve the coding efficiency in the motion-compensated coding scheme, the reference frame must be searched for an area with a largest correlation with the coding target block. However, upon enhancing the search precision, a calculation volume required for search becomes huge.

For example, a case will be examined below wherein coding is made in an image of 64×64 pixels/frame having gradation of 8 bits/pixel for respective blocks each including 16×16 pixels. In this case, upon conducting a full search that calculates a correlation value with a coding target block while shifting pixels one by one for the entire reference frame (64×64 pixels), 1048576 (=16×16×64×64) 8-bit comparison operations are required. In addition, since this calculation is made for each of a plurality of blocks of a coding target frame, a huge calculation volume is required.

In order to reduce the calculation volume, various schemes such as a motion search scheme using a binary image or N (M>N≧2)-arized image as a coding target image as an M (M>2)-arized image (for example, see JP-B-3028685, Jeng-Hung Luo, Chung-Neng Wang, and Tihao Chiang, "TA Novel All-Binary Motion Estimation (ABME) With Optimized Hardware Architectures", IEEE Transactions On Circuits And Systems For Video Technology, Vol. 12, No. 8, August 2002) and the like have been proposed. Since a binarized image search uses a binary image as an input image, a comparison operation per pixel uses a 1-bit comparison operation in place of the 8-bit comparison operation, thus reducing the calculation volume.

However, with the conventional binarized image search, although the calculation volume is reduced, since the input image is binarized, the correlation calculation precision is low, and the search precision of a motion destination of a coding target block, that is, that of a motion vector drops. For this reason, this consequently results in a coding efficiency drop. In case of an N-arized image search scheme, higher precision is assured than the binarized image search scheme, but that scheme also lowers gradation of the input image, thus posing the same problem.

SUMMARY OF THE INVENTION

The present invention has been made in consideration of the conventional problems. According to the present invention, there is provided an image coding apparatus and method, which can conduct a motion search with high precision while suppressing the calculation volume.

According to an aspect of the present invention, there is provided an image coding apparatus which divides a coding target image into a plurality of blocks, detects a motion vector for each block using a reference image, and performs coding of each block based on the motion vector, comprising: filter unit adapted to apply low-pass filter processing to the coding target image and the reference image as M (M>2)-arized images; N-arization processing unit adapted to convert a first N (M>N≧2)-arized image corresponding to the coding target image and a second N-arized image corresponding to the reference image by respectively N-arizing the coding target image and the reference image which have undergone the filter processing; first motion vector detection unit adapted to detect a motion vector using the second N-arized image for each of the plurality of blocks which form the first N-arized image; second motion vector detection unit adapted to detect a motion vector using the corresponding coding target image and the reference image for a block of the coding target image corresponding to the detection result of the first motion vector detection unit; motion compensation unit adapted to generate a motion-compensated image from the reference image using the detection result of the second motion vector detection unit; and coding processing unit adapted to apply coding processing to a difference between the coding target image and the motion-compensated image.

According to another aspect of the present invention, there is provided an image coding method which divides a coding target image into a plurality of blocks, detects a motion vector for each block using a reference image, and performs coding of each block based on the motion vector, comprising: a filter processing step of applying low-pass filter processing to the coding target image and the reference image as M (M>2)-arized images; an N-arization processing step of converting a first N (M>N≧2)-arized image corresponding to the coding target image and a second N-arized image corresponding to the reference image by N-arizing the coding target image and the reference image which have undergone the filter processing; a first motion vector detection step of detecting a motion vector using the second N-arized image for each of the plurality of blocks which form the first N-arized image; a second motion vector detection step of detecting a motion vector using the corresponding coding target image and the reference image for a block of the coding target image corresponding to the detection result of the first motion vector detection step; a motion compensation step of generating a motion-compensated image from the reference image using the detection result of the second motion vector detection step; and a coding processing step of applying coding processing to a difference between the coding target image and the motion-compensated image.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

<First Embodiment>

Figure 1:
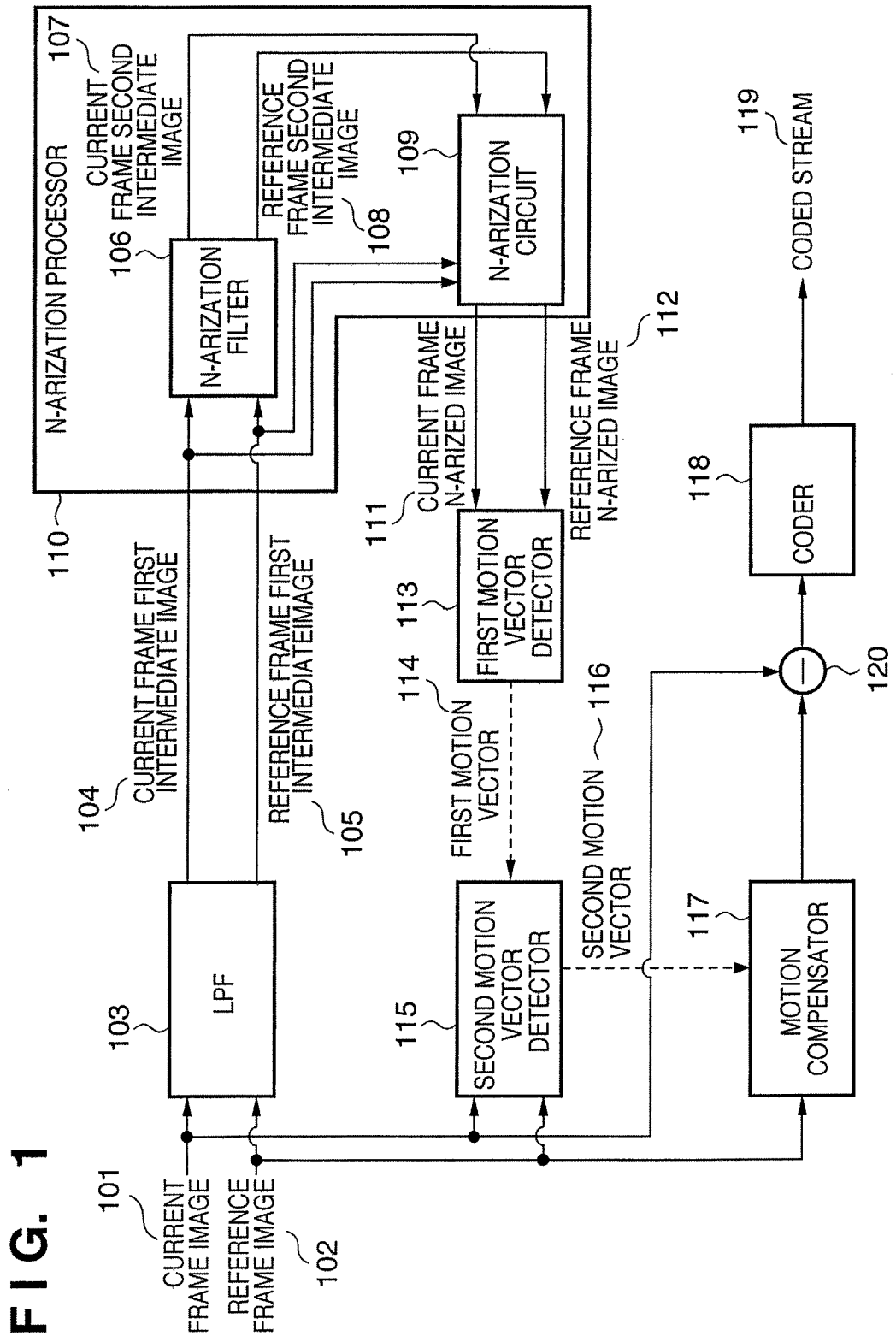
FIG. 1 is a block diagram showing an example of the arrangement of a coding apparatus according to the first embodiment of the present invention.

FIG. 1 is a block diagram showing an example of the arrangement of a coding apparatus according to the first embodiment of the present invention.

Referring to FIG. 1, a coding apparatus receives a current frame image 101 as a coding target image, and a reference frame image 102 which is referred to for the purpose of a motion vector search. Both these frame images 101 and 102 are multi-valued images (M (M>2)-arized images). The reference frame image 102 is a past or future frame image of the current frame image 101 in a moving image.

An LPF 103 is a low-pass filter. The current frame image 101 undergoes filter processing by the LPF 103, and is output as a current frame first intermediate image 104. The reference frame image 102 undergoes filter processing by the LPF 103, and is output as a reference frame first intermediate image 105.

An N-arization processor 110 (M>N≧2, N is an integer) has an N-arization filter 106 and N-arization circuit 109, and N-arizes and outputs the first intermediate images 104 and 105.

The N-arization filter 106 extracts characteristic frequency components of the intermediate images 104 and 105. The current frame first intermediate image 104 undergoes processing by the N-arization filter 106 and is output as a current frame second intermediate image 107. The reference frame first intermediate image 105 undergoes processing by the N-arization filter 106 and is output as a reference frame second intermediate image 108.

The N-arization circuit 109 assigns one of N values to pixels of the second intermediate images 107 and 108 and converts them into N-arized images. The current frame second intermediate image 107 is N-arized by the N-arization circuit 109 and is output as a current frame N-arized image 111. The reference frame second intermediate image 108 is N-arized by the N-arization circuit 109 and is output as a reference frame N-arized image 112.

A first motion vector detector 113 detects a motion vector from the current frame N-arized image 111 and reference frame N-arized image 112, and outputs the detection result as a first motion vector 114.

A second motion vector detector 115 detects a motion vector from the current frame image 101 and reference frame image 102 to have the first motion vector 114 as a reference point, and outputs the detection result as a second motion vector 116.

A motion compensator 117 applies motion compensation to the reference frame image 102 based on the second motion vector 116 to output a motion-compensated image. A subtractor 120 calculates the difference between the current frame image 101 and the motion-compensated image output from the motion compensator 117, and outputs a difference image.

A coder 118 applies quantization and variable-length coding to the difference image output from the subtractor 120 and outputs a coded stream 119.

The operation of the coding apparatus with the arrangement shown in FIG. 1 will be described below.

Figure 2:
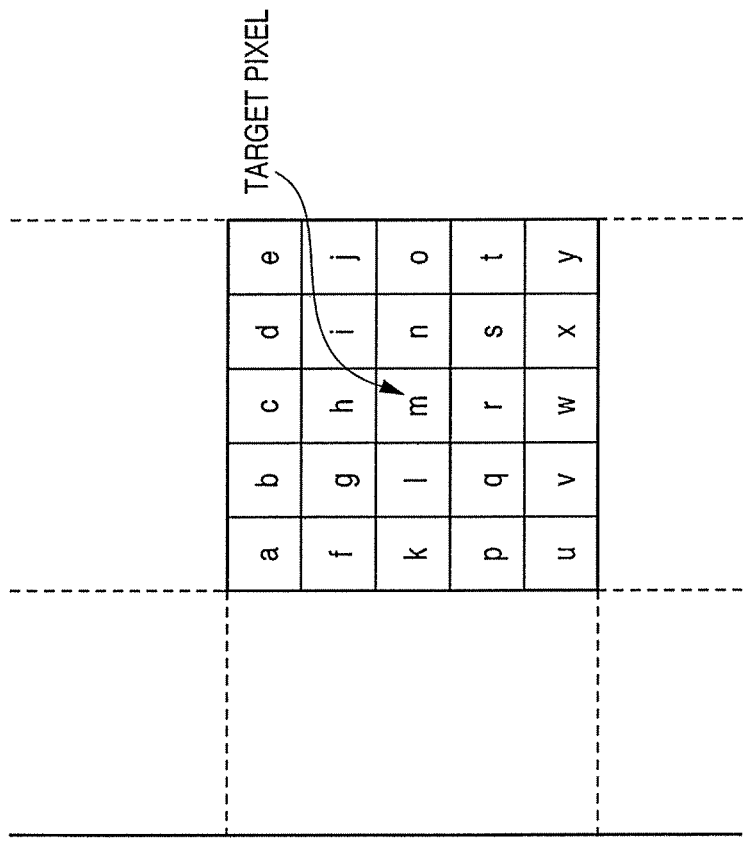
FIGS. 2A and 2B are views for explaining an LPF 103 according to one embodiment of the present invention.

The LPF 103 removes high-frequency components from the current frame image 101 and reference frame image 102. The filter characteristic is preferably set at a cutoff frequency lower than the Nyquist frequency. Alternatively, a plurality of filter characteristics may be set in advance, and may be selected in accordance with the detection result of the motion vector detector. More specifically, adaptive processing can be done according to the maximum value, minimum value, distribution condition, or the like of evaluation values for motion vector detection. FIGS. 2A and 2B are views for explaining the LPF 103 according to this embodiment. The LPF 103 comprises a weighted mean (smoothing) filter of 5×5 pixels, which has filter coefficients shown in, for example, FIG. 2A. Note that FIG. 2A shows values obtained by multiplying the filter coefficients by 256 for the sake of convenience.

Figure 3:
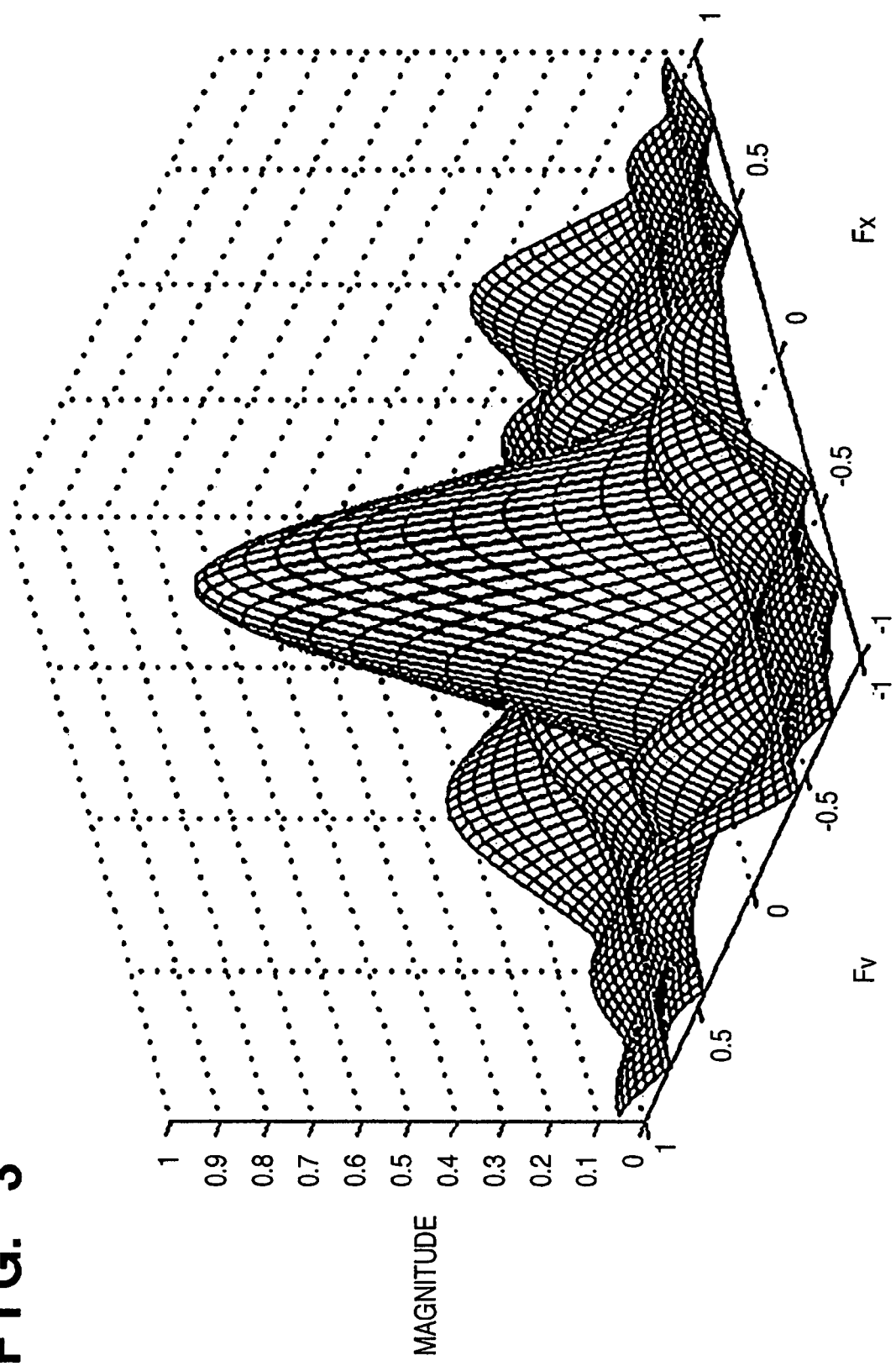
FIG. 3 shows an example of weighting characteristics of the LPF 103 shown in FIG. 2A.

FIG. 3 shows an example of the weighting characteristics of the LPF 103 with the filter coefficients shown in FIG. 2A.

Application of the LPF 103 to an image is described by an arithmetic operation given by:

$$M=(9 \times a+9 \times b+12 \times c+9 \times d+9 \times e+9 \times f+9 \times g+12 \times h+9 \times i+\\ 9 \times j+12 \times k+12 \times l+16 \times m+12 \times n+12 \times o+9 \times p+9 \times q+\\ 12 \times r+9 \times s+9 \times t+9 \times u+9 \times v+12 \times w+9 \times x+9 \times y)/256$$

where m in FIG. 2B is a processing target pixel, and M is a pixel value after the filter processing.

The current frame first intermediate image 104 and reference frame first intermediate image 105 which have undergone such filter processing for respective pixels are N-arized by the N-arization processor 110. Assume that N=2 in this embodiment.

Therefore, the N-arization processor 110 of this embodiment converts an image of 1 bit/pixel (1-bit image). In the N-arization processor 110, the N-arization filter 106 executes characteristic extraction processing of the current frame first intermediate image 104 and the reference frame first intermediate image 105. The filter 106 outputs the results as the current frame second intermediate image 107 and reference frame second intermediate image 108. The N-arization filter 106 can comprise, for example, a known edge extraction filter that executes characteristic extraction of high-frequency components.

Next, the N-arization circuit 109 as a binarization circuit in this embodiment converts the current frame binarized image 111 in which it sets white (=1) when the pixel value of the current frame second intermediate image 107 is smaller than the corresponding pixel value of the current frame first intermediate image 104, or black (=0) otherwise. Alternatively, the N-arization circuit 109 may convert the differences between the pixel values of the second intermediate image 107 and the corresponding pixel values of the current frame first intermediate image 104. Furthermore, the N-arization circuit 109 may execute a predetermined arithmetic operation. The N-arization circuit 109 applies the same processing to the reference frame second intermediate image 108 and the reference frame first intermediate image 105 and converts the reference frame binarized image 112.

Figure 4A:
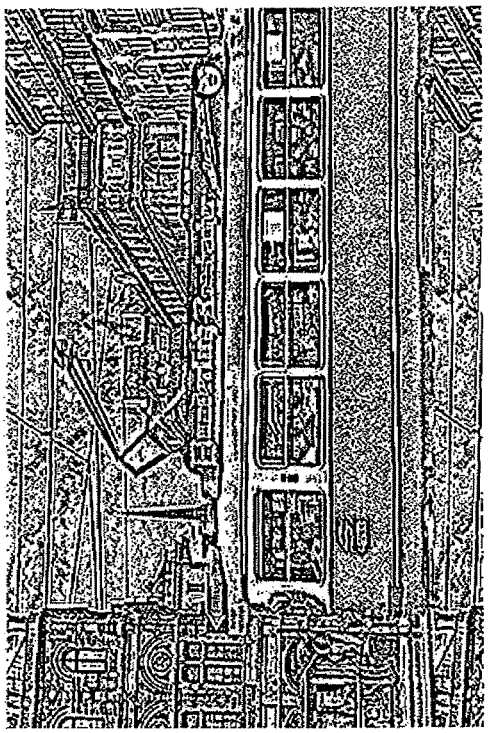
FIG. 4A shows an image which is binarized after it undergoes filter processing using the LPF 103.
Figure 4B:
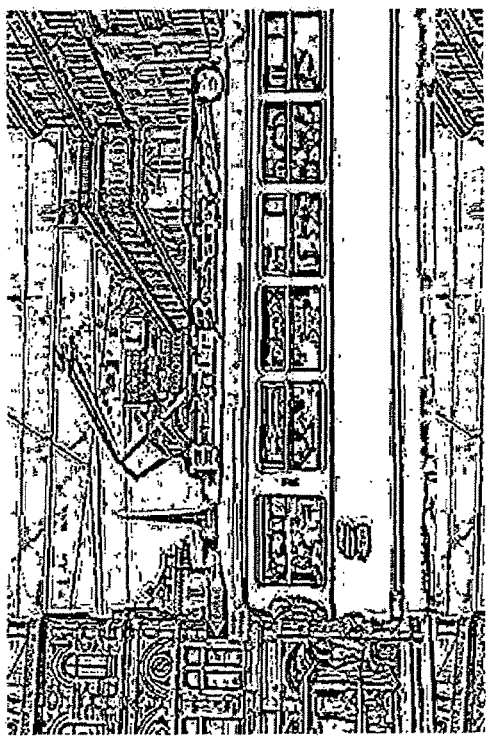
FIG. 4B shows an image which is binarized without any filter processing using the LPF 103.

FIGS. 4A and 4B show examples of an image which is binarized after it undergoes filter processing by the LPF 103 and an image which is binarized without any filter processing by the LPF 103. As can be confirmed from FIGS. 4A and 4B, high-frequency noise components are removed from a binarized image (FIG. 4A) which is converted after application of the LPF 103, while high-frequency noise is generated in a binarized image (FIG. 4B) which is converted without application of the LPF 103.

For this reason, by conducting a motion vector search using the binarized image converted after application of the LPF 103, any motion search precision drop due to high-frequency noise can be suppressed, and an improvement of coding efficiency can be consequently expected.

The first motion vector detector 113 executes block matching between a coding target block of the current frame N-arized image 111 and the reference frame N-arized image 112 to detect the first motion vector 114 for the coding target block. Since this embodiment uses the binarized image as a target, the first motion vector detector 113 can determine the degree of matching by calculating the exclusive ORs (XORs) between the pixels of the coding target block of the current frame N-arized image 111 and those of the reference frame N-arized image 112.

The second motion vector detector 115 executes block matching between a coding target block of the current frame image 101 and the reference frame image 102 using the first motion vector 114 as a reference point. Note that the search range of the second motion vector detector 115 is set to be narrower than that of the first motion vector detector 113. Assume that this embodiment adopts a search range of 1×1 pixels.

The motion compensator 117 generates a motion-compensated image from the second motion vector 116 and the reference frame image 102. The subtractor 120 calculates the difference between the coding target block of the current frame image 101 and the corresponding motion-compensated image, and supplies it to the coder 118.

The coder 118 applies quantization and variable-length coding to the difference between the motion-compensated image and the current frame image 101, and outputs the coded stream 119.

The processes of the first and second motion vector detectors 113 and 115, the motion compensator 117, and the coder 118 are sequentially applied to each coding target block of the current frame image 101 as a coding target image. Thus, coding of the current frame image 101 (inter motion-compensated frame predictive coding) is completed.

Figure 5:
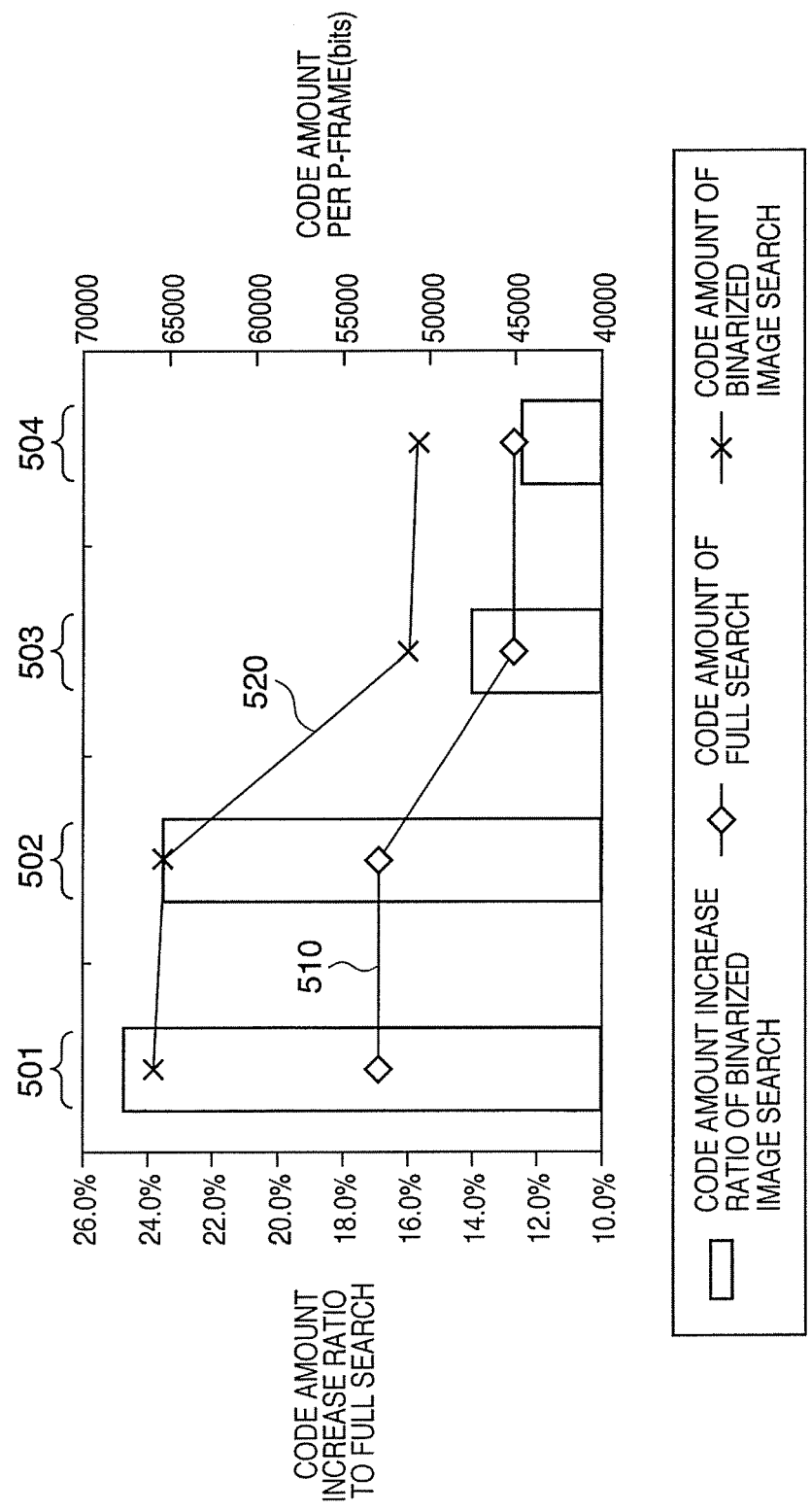
FIG. 5 is a graph showing the comparison result of code amounts upon application of only a binarized image search and the embodiment of the present invention to BTA (Broadcasting Technology Association) standard moving image No. 35.

FIG. 5 shows the comparison results upon application of only a binarized image search and this embodiment to BTA standard moving image No. 35. Application of only a binarized image search corresponds to a case wherein coding is done by a coding apparatus with the arrangement that does not apply any LPF 103 in this embodiment.

Line graphs 510 and 520 in FIG. 5 correspond to the right ordinate, and indicate a code amount (bits) per frame image that has undergone inter motion-compensated frame predictive coding. The line graph 510 indicates a code amount when using a motion vector detected by a full search, and the line graph 520 indicates a code amount upon detection of a motion vector using the binarized images.

A bar graph corresponds to the left ordinate, and indicates the increase ratio (%) of code amounts in the line graphs 510 and 520.

Reference numerals 501 and 502 denote cases wherein the search range in the first motion vector detector 113 is set as 16×16 pixels.

Therefore, the case 501 indicates that the code amount upon coding using the motion vector detected by the full search is about 53000 bits, the code amount upon coding using the motion vector detected by only the binarized image search using the search range of 16×16 pixels is about 66500 bits, and the code amount increase ratio of the latter to the former is about 25%.

Likewise, the case 502 indicates that the code amount upon coding using the motion vector detected by the full search is about 53000 bits, the code amount upon coding using the motion vector detected by the binarized image search according to this embodiment using the search range of 16×16 pixels is about 65200 bits, and the code amount increase ratio of the latter to the former is about 23%.

Furthermore, reference numerals 503 and 504 denote cases wherein coding is done under the same conditions as in the cases 501 and 502 except that the search range of the first motion vector detector 113 is set as 32×32 pixels.

As can be seen from FIG. 5, according to the coding apparatus of this embodiment, it can be confirmed that the code amounts can be reduced compared to application of only the binarized image search in both the motion vector search ranges of 16×16 pixels and 32×32 pixels.

As described above, according to this embodiment, after the low-pass filter processing is applied to the coding target frame image and reference frame image as M-arized images, N-arized (M>N≧2) images are converted. Using these N-arized images, a motion vector is searched. Since the N-arized images are used, a calculation volume required to detect the motion vector can be reduced. Since the low-pass filter processing is applied before conversion of the N-arized images, high-frequency noise components of the N-arized images can be reduced, and the detection precision of the motion vector using the N-arized images can be improved.

Therefore, according to this embodiment, a motion search with high precision can be conducted while suppressing the calculation volume. As a result, a code amount reduction (i.e., improvement of coding efficiency) can be realized.

<Second Embodiment>

Figure 6:
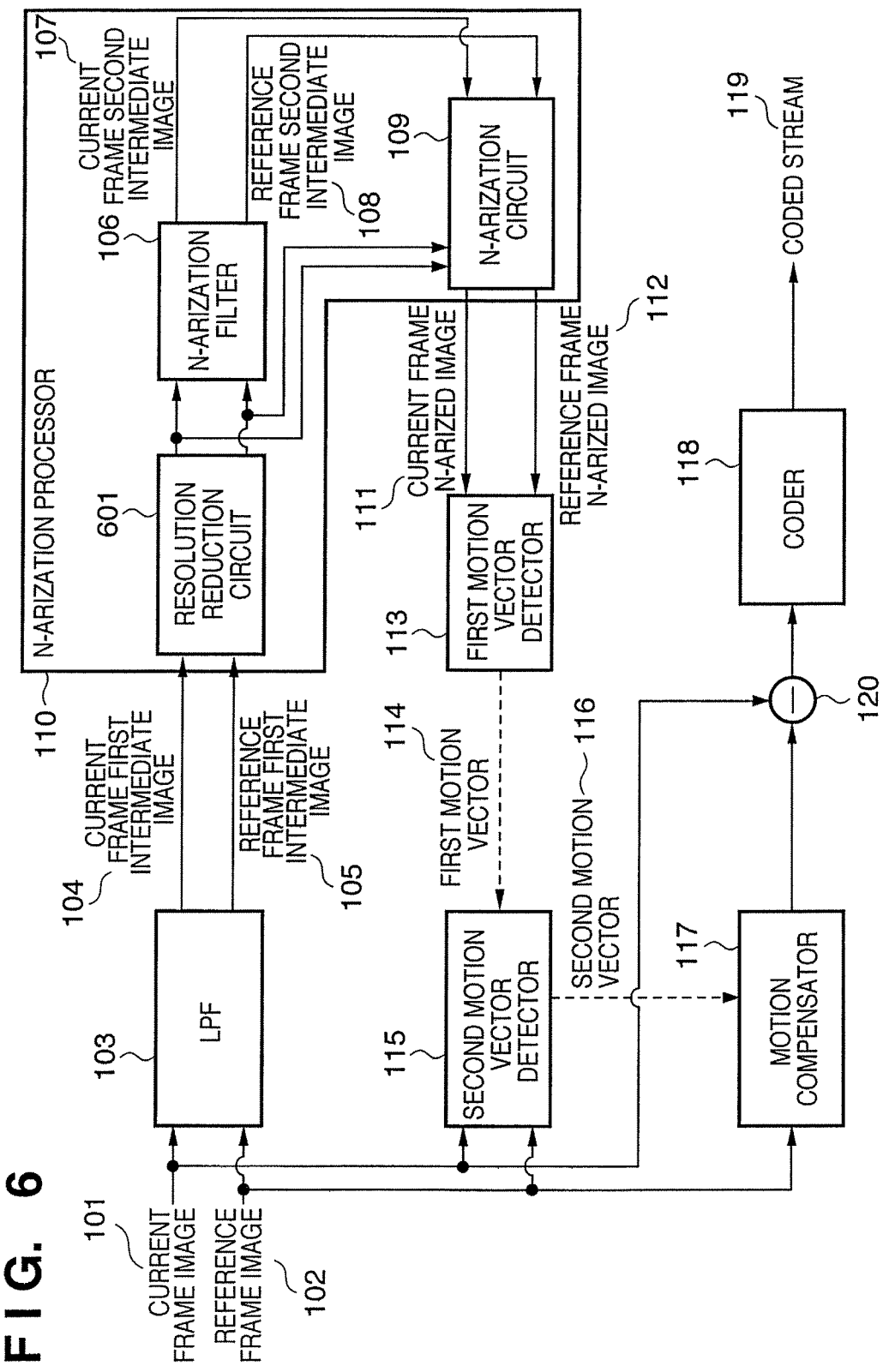
FIG. 6 is a block diagram showing an example of the arrangement of a coding apparatus according to the second embodiment of the present invention.

FIG. 6 is a block diagram showing an example of the arrangement of a coding apparatus according to the second embodiment of the present invention. In FIG. 6, the same reference numerals denote the same blocks as in FIG. 1, and a repetitive description thereof will be avoided.

The coding apparatus of this embodiment is different from that of the first embodiment in that the N-arization processor 110 includes a resolution reduction circuit 601. The resolution reduction circuit 601 receives the current frame first intermediate image 104 and the reference frame first intermediate image 105, and generates low-resolution images of the input images.

For example, this embodiment generates a low-resolution image having pixels 1/4 those of an original image by reducing the vertical and horizontal resolutions of the original image to 1/2. This embodiment generates a low-resolution image having pixels 1/4 those of the original image by replacing 4 (=2×2) pixels of the original image by an average pixel (a pixel having a value obtained by adding the four pixel values and dividing the sum by 4).

The N-arization filter 106 and N-arization circuit 109 apply the same processes to the low-resolution images. Therefore, the N-arization processor 110 outputs a low-resolution current frame N-arized image 111 and low-resolution reference frame N-arized image 112.

The first motion vector detector conducts a motion vector search using these low-resolution N-arized images 111 and 112. Since the processing after detection of the first motion vector 114 is the same as the first embodiment, a description thereof will not be given.

As described above, according to this embodiment, since the motion search is conducted using the low-resolution N-arized images, the calculation volume can be further reduced in addition to the effect of the first embodiment.

When the characteristics of the low-pass filter are changed according to the degree of reduction of the resolution, better characteristics can be assured. At this time, a cutoff frequency lower than the Nyquist frequency according to the resolution is preferably set.

<Other Embodiments>

The aforementioned embodiments can be implemented by software by a computer (or a CPU, MPU, or the like) of a system or apparatus.

Therefore, a computer program itself supplied to in the computer to implement the aforementioned embodiments using the computer implements the present invention. That is, the computer program itself for implementing the functions of the aforementioned embodiments is one embodiment of the present invention.

Note that the form of the program which implements the aforementioned embodiments using the computer is not particularly limited as long as that program can be converted into a format executable by the computer. For example, the program may adopt the forms of an object code, a program to be executed by an interpreter, script data to be supplied to an OS, and the like, but the present invention is not limited to them.

The program which implements the aforementioned embodiments using the computer is supplied to the computer via a computer-readable storage medium or wired/wireless communications. As the storage medium for supplying the program, for example, magnetic storage media such as a flexible disk, hard disk, magnetic tape, and the like, optical/magneto-optical storage media such as an MO, CD, DVD, and the like, a nonvolatile semiconductor memory, and so forth may be used.

As a program supply method using the wired/wireless communications, a method using a server on a computer network is available. In this case, a server stores a data file (program file) that can be a program which makes the computer implement the aforementioned embodiments. The program file may be either an executable format file or source codes.

Then, the program file is supplied by downloading to a client computer that has accessed the server. In this case, the program file may be segmented into a plurality of segment files, which may be allocated on different servers.

That is, the server which provides the program file for implementing the aforementioned embodiments using the computer to the client computer is also one embodiment of the present invention.

Also, a storage medium, which stores the encrypted program which implements the aforementioned embodiments using the computer, may be delivered to the user, and key information required to decrypt the encrypted program may be supplied to the user who meets a predetermined condition, so as to allow installation of the program on a user's computer. The key information can be supplied to the user by making him or her download it from a home page via, for example, the Internet.

The program for implementing the aforementioned embodiments using the computer may use the functions of other kinds of software which normally run on the computer and, typically, those of basic software (OS).

Furthermore, at least some functions of the program for implementing the aforementioned embodiments using the computer may be configured by firmware which runs on an expansion board or the like inserted into the computer, or some functions may be implemented by a CPU of the expansion board or the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-238170, filed Sep. 1, 2006, which is hereby incorporated by reference herein in its entirety.

What is claimed is:

1. An image coding apparatus which divides a coding target image into a plurality of blocks, detects a motion vector for each block using a reference image, and performs coding of each block based on the motion vector, the apparatus comprising:
   a filter unit adapted to apply low-pass filter processing to the coding target image and the reference image as M (M>2)-arized images;
   an N-arization processing unit adapted to generate a first N (M>N≧2)-arized image corresponding to the coding target image and a second N-arized image corresponding to the reference image by respectively N-arizing the coding target image and the reference image which have undergone the filter processing by assigning one of N (M>N≧2) values to each pixel of the coding target image and the reference image which have undergone the filter processing;
   a first motion vector detection unit adapted to detect a motion vector using the second N-arized image for each of the plurality of blocks which form the first N-arized image;
   a second motion vector detection unit adapted to detect a motion vector using the corresponding coding target image and the reference image for a block of the coding target image corresponding to the detection result of said first motion vector detection unit;
   a motion compensation unit adapted to generate a motion-compensated image from the reference image using the detection result of said second motion vector detection unit; and
   a coding processing unit adapted to apply coding processing to a difference between the coding target image and the motion-compensated image.

2. The apparatus according to claim 1, wherein a motion vector search range in said second motion vector detection unit is narrower than a motion vector search range in said first motion vector detection unit.

3. The apparatus according to claim 1, wherein said N-arization processing unit comprises:
   a characteristic extraction unit adapted to apply characteristic extraction processing to the coding target image and the reference image which have undergone the filter processing; and
   an N-arization unit adapted to generate the first N-arized image and the second N-arized image using arithmetic operation results before and after the processing of said characteristic extraction unit.

4. The apparatus according to claim 1, wherein said N-arization processing unit further generates the first N-arized image and the second N-arized image which have a resolution lower than the coding target image and the reference image that have undergone the filter processing.

5. An image coding method which divides a coding target image into a plurality of blocks, detects a motion vector for each block using a reference image, and performs coding of each block based on the motion vector, the method comprising:

a filter processing step of applying low-pass filter processing to the coding target image and the reference image as M (M>2)-arized images;

an N-arization processing step of generating a first N (M>N≧2)-arized image corresponding to the coding target image and a second N-arized image corresponding to the reference image by N-arizing the coding target image and the reference image which have undergone the filter processing by assigning one of N (M>N ≧2) values to each pixel of the coding target image and the reference image which have undergone the filter processing;

a first motion vector detection step of detecting a motion vector using the second N-arized image for each of the plurality of blocks which form the first N-arized image;

a second motion vector detection step of detecting a motion vector using the corresponding coding target image and the reference image for a block of the coding target image corresponding to the detection result of the first motion vector detection step;

a motion compensation step of generating a motion-compensated image from the reference image using the detection result of the second motion vector detection step; and a coding processing step of applying coding processing to a difference between the coding target image and the motion-compensated image.

6. A non-transitory computer-readable recording medium which stores a program for making a computer function as a coding apparatus according to claim 1.

* * * * *